(12) United States Patent
Jiang et al.

(10) Patent No.: US 11,704,625 B2
(45) Date of Patent: Jul. 18, 2023

(54) KNOWLEDGE MANAGEMENT DEVICE, METHOD, AND COMPUTER PROGRAM PRODUCT FOR A SOFTWARE PROJECT (71) Applicant: IsCoolLab Co., Ltd., Taipei (TW)

(72) Inventors: Yan-Mei Jiang, Taipei (TW); Wei-Nien Hsiung, Taipei (TW)

(73) Assignee: IsCoolLab Co., Ltd., Taipei (TW)

( * ) Notice: Subject to any disclaimer, the term of this patent is extended or adjusted under 35 U.S.C. 154(b) by 0 days.

(21) Appl. No.: 17/371,100

(22) Filed: Jul. 8, 2021

(65) Prior Publication Data

US 2022/0058584 A1 Feb. 24, 2022

(30) Foreign Application Priority Data

Aug. 21, 2020 (TW) .................................. 109128595

(51) Int. Cl.
G06Q 10/10 (2023.01)
G06F 8/20 (2018.01)
G06F 3/0482 (2013.01)

(52) U.S. Cl.
CPC ............. *G06Q 10/103* (2013.01); *G06F 8/20* (2013.01); *G06F 3/0482* (2013.01)

(58) Field of Classification Search
CPC ... G06F 8/73; G06F 16/35; G06F 8/20; G06F 3/0482; G06Q 10/103
See application file for complete search history.

(56) References Cited

U.S. PATENT DOCUMENTS

| 8,738,751 B2 | 5/2014 | Long et al. | |
| 2008/0027769 A1 | 1/2008 | Eder | |
| 2012/0204131 A1* | 8/2012 | Hoang | G06F 3/0482 |
| | | | 715/835 |
| 2013/0110565 A1 | 5/2013 | Means, Jr. et al. | |
| 2019/0004873 A1* | 1/2019 | Liu | G06F 16/35 |
| 2020/0175099 A1* | 6/2020 | Ono | G06F 40/106 |
| 2021/0011714 A1* | 1/2021 | Goodsitt | G06N 3/044 |

(Continued)

FOREIGN PATENT DOCUMENTS

| CN | 100380373 C | 4/2008 |
| CN | 102930374 B | 11/2015 |

(Continued)

OTHER PUBLICATIONS

EPC Beijing Inc; Translated CN 102930374; 2015; 17 pages (Year: 2015).*

(Continued)

*Primary Examiner* — S. Sough
*Assistant Examiner* — Cuong V Luu
(74) *Attorney, Agent, or Firm* — Skaar Ulbrich Macari, P.A.

(57) ABSTRACT

A knowledge management device stores a first object and a second object. A type of each of the first object and the second object is a software-project package, source code, or a description document. The knowledge management device receives an association command and establishes an association relation between the first object and the second object in response to the association command. The knowledge management device further presents the association relation in a graphical user interface so that a user performs at least one management operation according to the association relation presented.

17 Claims, 9 Drawing Sheets (56) References Cited

U.S. PATENT DOCUMENTS

2021/0216288 A1* 7/2021 Bahrami ............. G06F 11/3688
2021/0311729 A1* 10/2021 Gupta .................... G06N 3/045

FOREIGN PATENT DOCUMENTS

| CN | 109947915 A | 6/2019 |
|---|---|---|
| CN | 110110077 A | 8/2019 |
| WO | 0031671 A1 | 6/2000 |

OTHER PUBLICATIONS

Adrian Kuhn; Automatic Labeling of Software Components and their Evolution using Log-Likelihood Ratio of Word Frequencies in Source Code; IEEE; pp. 175-178; retrieved on Apr. 24, 2023 (Year: 2009).*

Jordi Cabot; Exploring the Use of Labels to Categorize Issues in Open-Source Software Projects; IEEE; pp. 550-554; retrieved on Apr. 24, 2023 (Year: 2015).*

Office Action to the corresponding Taiwan Patent Application rendered by the Taiwan Intellectual Property Office (TIPO) dated Oct. 21, 2021, 10 pages (including English translation).

* cited by examiner

KNOWLEDGE MANAGEMENT DEVICE, METHOD, AND COMPUTER PROGRAM PRODUCT FOR A SOFTWARE PROJECT

PRIORITY

This application claims priority to Taiwan Patent Application No. 109128595 filed on Aug. 21, 2020, which is incorporated herein by reference in its entirety.

FIELD

The present disclosure relates to a knowledge management device, a method, and a computer program product for a software project. More specifically, the present disclosure relates to a knowledge management device, a method, and a computer program product for establishing association relation between objects in a software project to assist a user to perform a management operation.

BACKGROUND

In the practice of software development, the versions of objects (e.g., an entire software-project package, or source code or a description document thereof) in a software projects are frequently updated, and some software projects are associated with other software projects. Therefore, in the process of software development, it is important to perform knowledge management for software projects in order to ensure the provision of correct information. Conventional techniques of knowledge management only focus on recording and presenting each version of objects in a software project in a form of images rather than maintaining association relations between the objects and presenting said association relations to the user. Therefore, even if two of the objects in the software project are substantially associated (e.g., source codes and the corresponding description documents are associated), when a user views one of the two objects in the software project, he/she needs to traverse other objects in the software project so as to figure out the association relation between that object and the other one of the two objects, and thereby finally finding out the other object. Said situation has reduced the efficiency of software development indirectly.

In addition, when one of the two objects that are associated in a software project has undergone a change of version, the conventional techniques of knowledge management are not able to find out whether, and to what extent, the association relation between the two objects has been affected correspondingly. For example, when source code has been changed for one or more times, the description document corresponding to the source code may no longer be able to describe/explain the content of the source code effectively, or it may still be able to describe/explain the source code completely, depending on the change of the contents. Therefore, if the association relation between the two objects was not evaluated in time, the user cannot determine whether the association relation between the two objects is still valid, and whether it is necessary to create another associated object for the object that undergoes a change of version (e.g., create a new description document for the source code that has been changed for one or more times). As a result, the quality of a software project and the efficiency of software development could be reduced.

In view of the above situation, there is an urgent need for improving the efficiency of software development and maintaining the quality of a software project through knowledge management in the process of software development.

SUMMARY

An objective of the present disclosure is to provide a knowledge management device for a software project. The knowledge management device may comprise a storage, at least one input/output (I/O) interface, and a processor electrically connected with the storage and the at least one I/O interface. The storage may be configured to store a first object and a second object. A type of each of the first object and the second object may be a software-project package, source code, or a description document. The at least one I/O interface may be configured to receive an association command. The processor may be configured to establish an association relation between the first object and the second object in response to the association command. The at least one I/O interface may be further configured to present the association relation in a graphical user interface so that a user performs at least one management operation according to the association relation presented.

Another objective of the present disclosure is to provide a knowledge management method for a software project, which is for use in an electronic computing device. The electronic computing device may store a first object and a second object, and a type of each of the first object and the second object is a software-project package, source code, or a description document. The knowledge management method may comprise a step of receiving an association command. The knowledge management method may further comprise another step of establishing an association relation between the first object and the second object in response to the association command. The knowledge management method may further comprise another step of presenting the association relation in a graphical user interface so that a user performs at least one management operation according to the association relation presented.

Yet another objective of the present disclosure is to provide a computer program product. An electronic computing device may execute a knowledge management method after a plurality of program instructions comprised in the computer program product are loaded into the electronic computing device. The electronic computing device may store a first object and a second object, a type of each of the first object and the second object is a software-project package, source code, or a description document. The knowledge management method may comprise a step of receiving, by the electronic computing device, a first association command. The knowledge management method may further comprise a step of establishing, by the electronic computing device, a first association relation between the first object and the second object in response to the first association command. The knowledge management method may further comprise a step of presenting, by the electronic computing device, the first association relation in a graphical user interface so that a user performs at least one management operation according to the first association relation presented The knowledge management techniques (including at least the aforementioned device, method, and computer program product) for a software project provided by the present disclosure establishes an association relation between the first object and the second object that are associated with the software project in response to the association command, maintains the association relation during the process of software development, and presents the association relation in a graphical user interface for a user so that the user can perform a more efficient management operation, for example, searching out the first object and the second object quickly through the association relation, thereby saving the time for traversing the entire software project. The user may further perform corresponding management operations to maintain the quality of the software project, such as determining that whether it is necessary to create another object with an association relation for the first object and/or the second object based on the association relation presented. Thus, the knowledge management techniques provided by the present disclosure can certainly improve the efficiency of development and maintains the quality of the software project during the process of software development.

The detailed techniques and exemplary embodiments implemented for the present disclosure are described in the following paragraphs accompanying the appended drawings for a person having ordinary skill in the art to well appreciate the technical features of the claimed invention

BRIEF DESCRIPTION OF THE DRAWINGS

The drawings can assist the description of the present disclosure, wherein.

DETAILED DESCRIPTION

In the following description, the knowledge management device, knowledge management method and corresponding computer program product provided by the present disclosure will be explained with reference to certain example embodiments thereof. However, the description of these example embodiments are not intended to limit the claimed invention to any environment, applications, or implementations described in these example embodiments. Instead, descriptions of these example embodiments are only for purpose of illustration rather than limiting the present invention. It should be appreciated that, in the following embodiments and the attached drawings, elements unrelated to the present disclosure are omitted from depiction. In addition, dimensions of and dimensional scales among individual elements in the attached drawings are provided only for illustration, instead of limiting the scope of the present invention.

Figure 1:
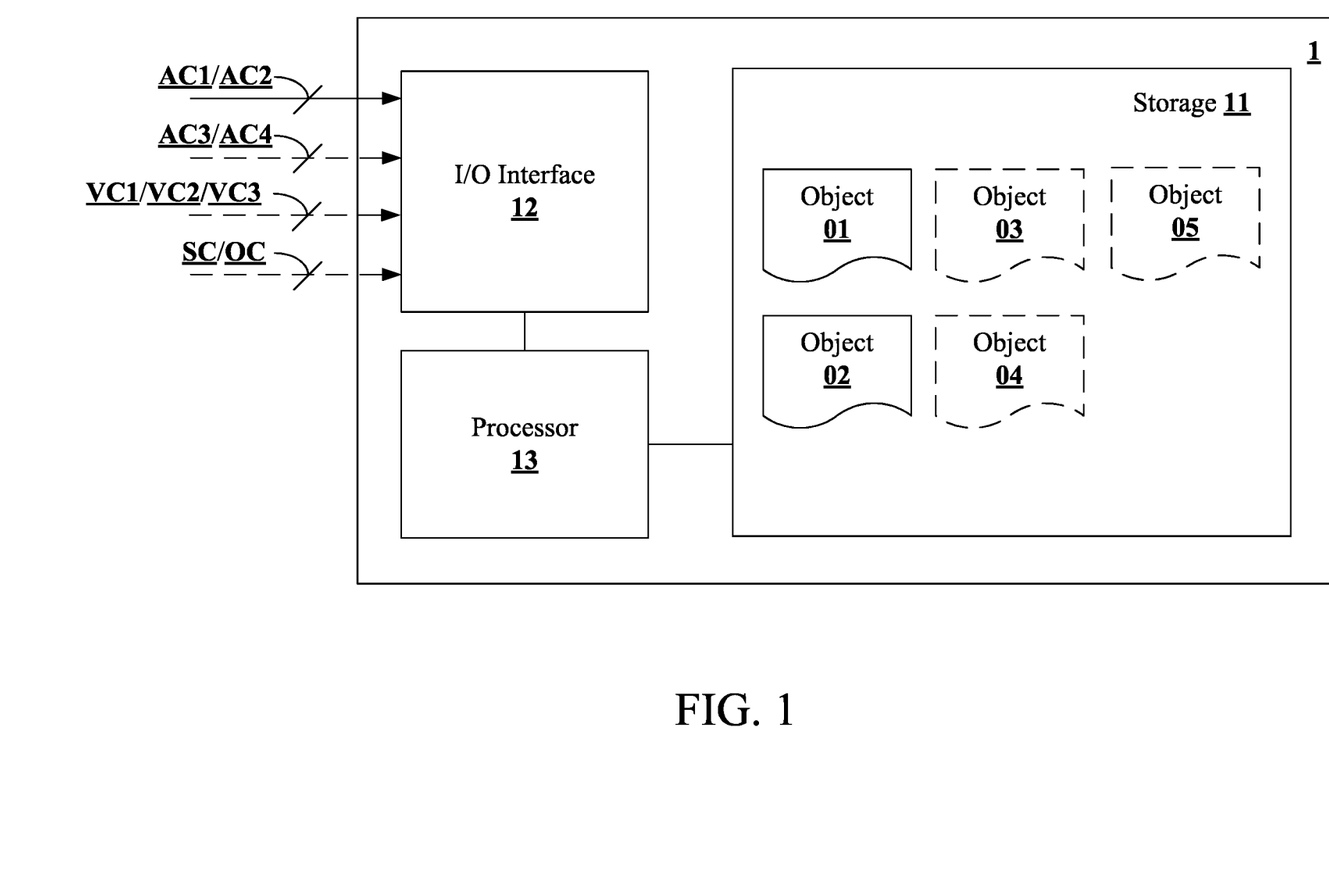
FIG. 1 depicts a schematic view of the structure of a knowledge management device according to a first embodiment of the present disclosure.

A first embodiment of the present disclosure is a knowledge management device 1 for a software project, and a schematic view of the structure thereof is depicted in FIG. 1. The content shown in FIG. 1 is only for illustrating the embodiment of the present invention, instead of limiting the present invention.

Referring to FIG. 1, the main character of this embodiment is the knowledge management device 1. The knowledge management device 1 may comprise a storage 11, at least one I/O interface 12, and a processor 13 electrically connected with the storage 11 and the at least one I/O interface 12. The storage 11 may be a memory, a mobile disk, a Hard Disk Drive (HDD), or any other non-transitory storage medium or device with the same function and well-known to a person having ordinary skill in the art. The storage 11 may be configured to store data (e.g., objects 01, 02, 03, 04 and 05, which will be further described in the following description) required by the knowledge management device 1 when managing a software project, and store other data and program generated during the runtime. The I/O interface 12 may be an interface configured to input the information received thereby (e.g., association commands AC1, AC2, AC3 and AC4, viewing commands VC1, VC2 and VC3, searching command SC, and/or sorting command OC, which will be further described in the following description) to the knowledge management device 1, and/or being configured to output the information of the knowledge management device 1 in various forms. For example, the I/O interface 12 may be a touch panel display which is capable of inputting and outputting. For another example, the I/O interface 12 may include an input interface which is connected to a mouse and a keyboard, and an output interface which is connected to a display. The processor 13 may be one of various processors, Central Processing Unit (CPU), Microprocessor, or other computing elements with the same or similar functions known to a person having ordinary skill in the art.

Since knowledge management device 1 may be configured to manage a software project and objects in the software project such as source codes or description documents, the storage 11 may store said objects in the managed software project. Specifically, the type of each of the objects 01, 02, 03, 04 and 05 stored in the storage 11 may be a software-project package, source code, or a description document. In the specification of the present disclosure, a software-project package may include all files in a software project, and a description document may be a file for describing a specific part of, or the entirety of, the software project or the source code. The format of the description document may be, but not limited to, a document file, an image file, an audio file, or a video file.

Figure 2A:
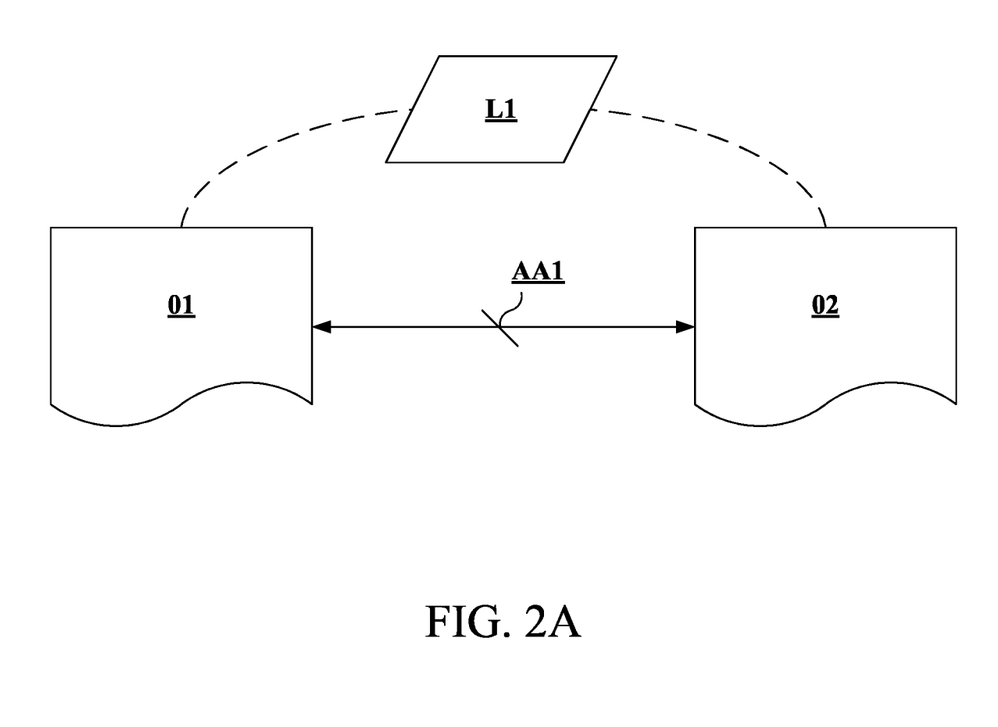
FIG. 2A depicts a schematic view of an association relation between a first object and a second object in the first embodiment.

In this embodiment, regardless of the objects 01 and 02 belonging to what type(s) as mentioned above, the I/O interface 12 may receive an association command AC1, the processor 13 may then establish an association relation AA1 between the objects 01 and 02 in response to the association command AC1, and the I/O interface 12 may present the association relation AA1 in a graphical user interface. The specific details of an association command, a corresponding association relation, and how to present the association relation in this embodiment are described in the following paragraphs accompanying FIG. 1, FIG. 2A, and FIG. 2B. It should be appreciated that the contents shown in FIG. 2A and FIG. 2B are only for illustrating the embodiments of the present invention, instead of limiting the present disclosure.

Specifically, the association command AC1 may be a command set including a first marking command and a second marking command. Referring to FIG. 2A, the processor 13 may mark a label L1 to the object 01 in response to the first marking command, and may mark the label L1 to the object 02 in response to the second marking command. Accordingly, the objects 01 and 02 may have the same label L1, which is the association relation AA1 between the objects 01 and 02. For example, a user may mark a label of "deep learning" (i.e., the label L1) to source code (i.e., the object 01) and a description document (i.e., the object 02) by inputting the first marking command and the second marking command in the association command AC1 respectively through the I/O interface 12, which means that the source code and the description document are both classified as objects that are associated with deep learning by the user.

Figure 2B:
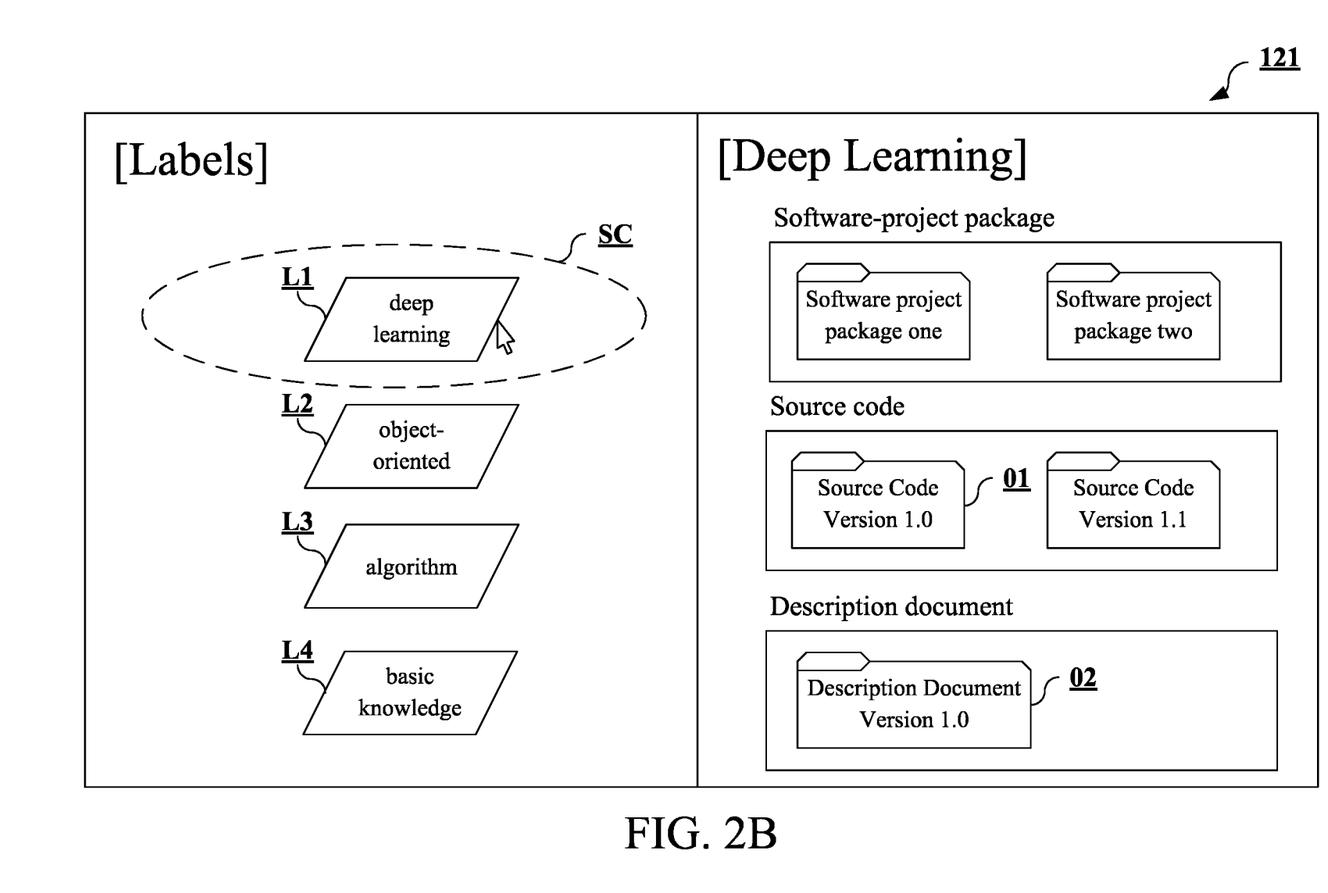
FIG. 2B depicts a schematic view of how a graphical user interface in the first embodiment presents an association relation.

Referring to FIG. 2B, the I/O interface 12 (e.g., a graphics card) may present the label L1 and other labels such as labels L2, L3, L4, or the like in a graphical user interface 121. The user may input a searching command SC corresponding to the label L1 to the knowledge management device 1 through the I/O interface 12 (e.g., clicking a link corresponding to the label L1 with a mouse), meaning that the user intends to view the objects that are marked with the label L1. After the I/O interface 12 received the searching command SC, the processor 13 searches out all objects that are marked with the label L1 in response to the searching command SC, and the I/O interface 12 also presents all the objects that are marked with the label L1 in the graphical user interface 121, including the objects 01 and 02. Since the I/O interface 12 presents the association relation AA1 between the objects 01 and 02 in the graphical user interface 121 (i.e., the objects 01 and 02 have the same label L1), the user may perform corresponding management operations accordingly, such as viewing objects that are marked with label L1 one by one.

In some embodiments, the I/O interface 12 may also receive a sorting command OC (e.g., the user may input a sorting command OC through the I/O interface 12), and the processor 13 may sort all objects that are marked with the label L1 in an order in response to the sorting command OC. The I/O interface 12 may present all of the objects that are marked with the label L1 in the graphical user interface 121 according to the order. For example, the sorting instruction OC may be a sorting algorithm or at least one sorting action that is performed by a human and is well-known in the art. The order may be a browsing order designed for a specific purpose (e.g., for teaching or demonstration), and therefore the user may perform corresponding management operations, such as browsing all of the objects that are marked with the same label in the order.

It should be appreciated that, although the above descriptions use the label L1 as an example, a person having ordinary skill in the art should understand that the knowledge management device 1 can create other labels, and can also perform similar operations to the other labels, and hence similar details will not be repeated herein.

In this embodiment, in addition to the association relation which is "two objects of any type(s) can have the same label", the processor 13 may also establish other association relation among the objects according to the different types of the objects and the association commands. The specific details of another association command, a corresponding association relation, and how to present the association relation of this embodiment are described in the following paragraphs accompanying FIG. 1, FIG. 3A, and FIG. 3B, FIG. 3C, FIG. 3D, and FIG. 3E. It should be appreciated that the contents shown in FIG. 3A, and FIG. 3B, FIG. 3C, FIG. 3D, and FIG. 3E are only for illustrating the embodiment of the present disclosure, instead of limiting the present disclosure.

Figure 3A:
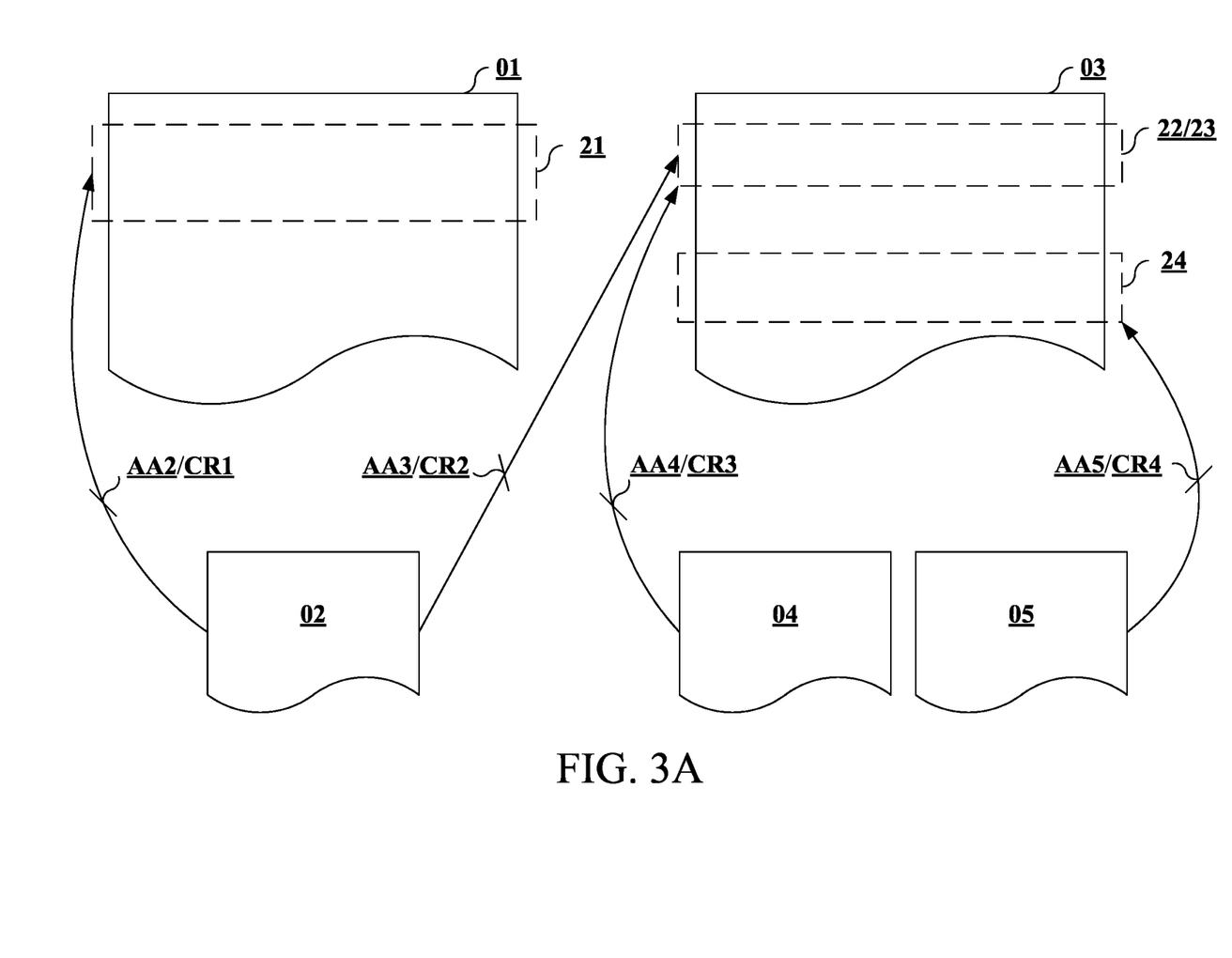
FIG. 3A depicts a schematic view of multiple association relations between multiple objects in the first embodiment.

Referring to FIG. 3A, it is assumed that the type of the object 01 is source code, and the type of the object 02 is a description document. The I/O interface 12 may receive an association command AC2, and the processor 13 may establish an association relation AA2 between the objects 01 and 02 in response to the association command AC2. Specifically, the association command AC2 may be an action to mark the contents of two objects in the software project as associated contents. For example, the user may select a block of source code in the object 01 and add a description document (i.e., the object 02) for the block, which means that the content of the object 02 can be used to describe/explain the block of source code in the object 01. Through the association command AC2, a content association exists between the objects 01 and 02, and said content association may be the association relation AA2 between the objects 01 and 02.

Specifically, the processor 13 may determine a covered area 21 corresponding to the object 02 in the object 01 according to the association command AC2. For example, the covered area 21 may be a code segment, a function, a method, a class, a constructor, or the like in the object 01, and the object 02 may be a description document for describing the source code corresponding to the covered area 21 in the object 01.

After determining the covered area 21, the processor 13 may determine a coverage rate CR1 of the object 02 corresponding to the covered area 21. For example, the object 02 may be a description document created by the user for describing the covered area 21 of the object 01 (e.g., a code snippet, a specific function, a specific method, a specific type, or a specific constructor in the object 01). Therefore, the processor 13 may determine that the coverage rate CR1 of the object 02 corresponding to the covered area 21 is "100%", which means that the object 02 can describe/explain the whole content in the covered area 21.

Figure 3B:
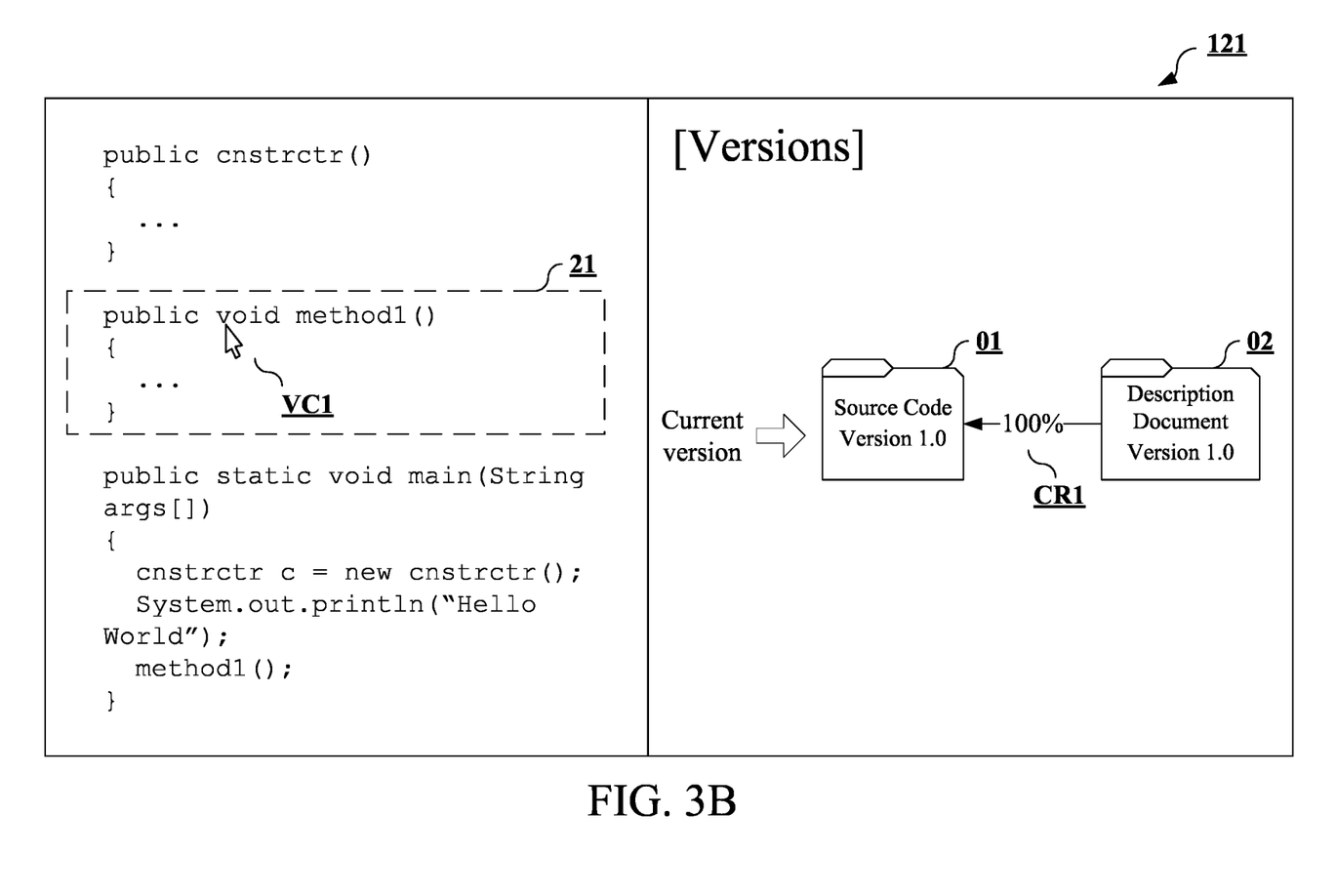
FIG. 3B, FIG. 3C, FIG. 3D, and FIG. 3E all depict another schematic view of how the graphical user interface in the first embodiment presents association relations.

The I/O interface 12 may further receive a viewing command VC1 for the covered area 21 based on the user's operation. Referring to FIG. 3B, in response to the viewing command VC1, the I/O interface 12 may present the object 02 and the coverage rate CR1 of the object 02 corresponding to the covered area 21 in the graphical user interface 121. For example, the I/O interface 12 may present the content (i.e., the source code) of the object 01 in a code section of the graphical user interface 121 for the user to view. The user may input the viewing command VC1 for the covered area 21 through the I/O interface 12 (e.g., with a mouse and in response to an event generated by the cursor of the mouse moving to the covered area 21 or clicking on the covered area 21). The object 02 associated with the object 01 and the coverage rate CR1 of the object 02 corresponding to the covered area 21 may then be presented in a version-listing section (which is titled as "[Versions]" in FIGS. 3B-3E) of the graphical user interface 121 by the I/O interface 12 in response to the viewing command VC1. Accordingly, the user may realize that there is an association relation AA2 between the objects 01 and 02, and that the association relation AA2 is that "the object 02 is used for describing the covered area 21 of the object 01". The user may also, according to the coverage rate CR1, realize the extent to which the object 02 can describe/explain the covered area 21, and said extent can also be understood as the effectiveness of the object 02 regarding the covered area 21.

As shown in FIG. 3A, since the content of source code varies from time to time, the storage 11 may also store an object 03, whose type is source code, and the object 03 is a revision of the object 01. In other words, the objects 01 and 03 are source codes of different versions. In the process of software development, when the version of source code is updated, it is better to create a description document for the new version simultaneously such that the programmers and/or others can understand the source code of the new version in the future. However, in practice, the description document is often not updated as frequently as the change of the version of source code. Instead, the existing description document (e.g., the latest version) is still used as the corresponding description document. Therefore, when the object 03, which is the new version of the object 01, is stored in the storage 11, the processor 13 may establish an association relation AA2 for the objects 02 and 03, indicating that a content association exists between the objects 03 and 02. In other words, the object 02 is a description document which can be used to describe/explain the content of the object 03.

The coverage rate of the content of the object 02 may be affected (usually being reduced) when the content corresponding to the covered area 21 of the object 01 has been modified during the evolution from the object 01 to the object 03. Thus, the processor 13 may determine a correspondence area 22 of the object 03 corresponding to the covered area 21 according to the covered area 21 and the content of the object 03. For example, the processor 13 may examine the content in the covered area 21 corresponding to the object 03 through a utility program named "diff" or similar techniques, so as to determine the correspondence area 22. The correspondence area 22 represents a corresponding area of the object 03 after the content corresponding to the covered area 21 has been modified, and the correspondence area 21 may be considered as the covered area 21 being expanded, reduced, deleted, or even divided into multiple scattered blocks, when compared with the original covered area 21.

After determining the correspondence area 22 of the covered area 21 in the object 03, the processor 13 may also calculate a coverage rate CR2 of the object 02 corresponding to the correspondence area 22 according to the correspondence area 22 and the covered area 21. Specifically, the processor 13 may determine the extent (e.g., a percentage) to which the content in the correspondence area 22 is consistent with the covered area 21 by comparing the corresponding contents between the covered area 21 and the correspondence area 22. Under the circumstance that the coverage rate CR1 of the object 02 for the covered area 21 has been known, the processor 13 may calculate the coverage rate CR2 accordingly.

Figure 3C:
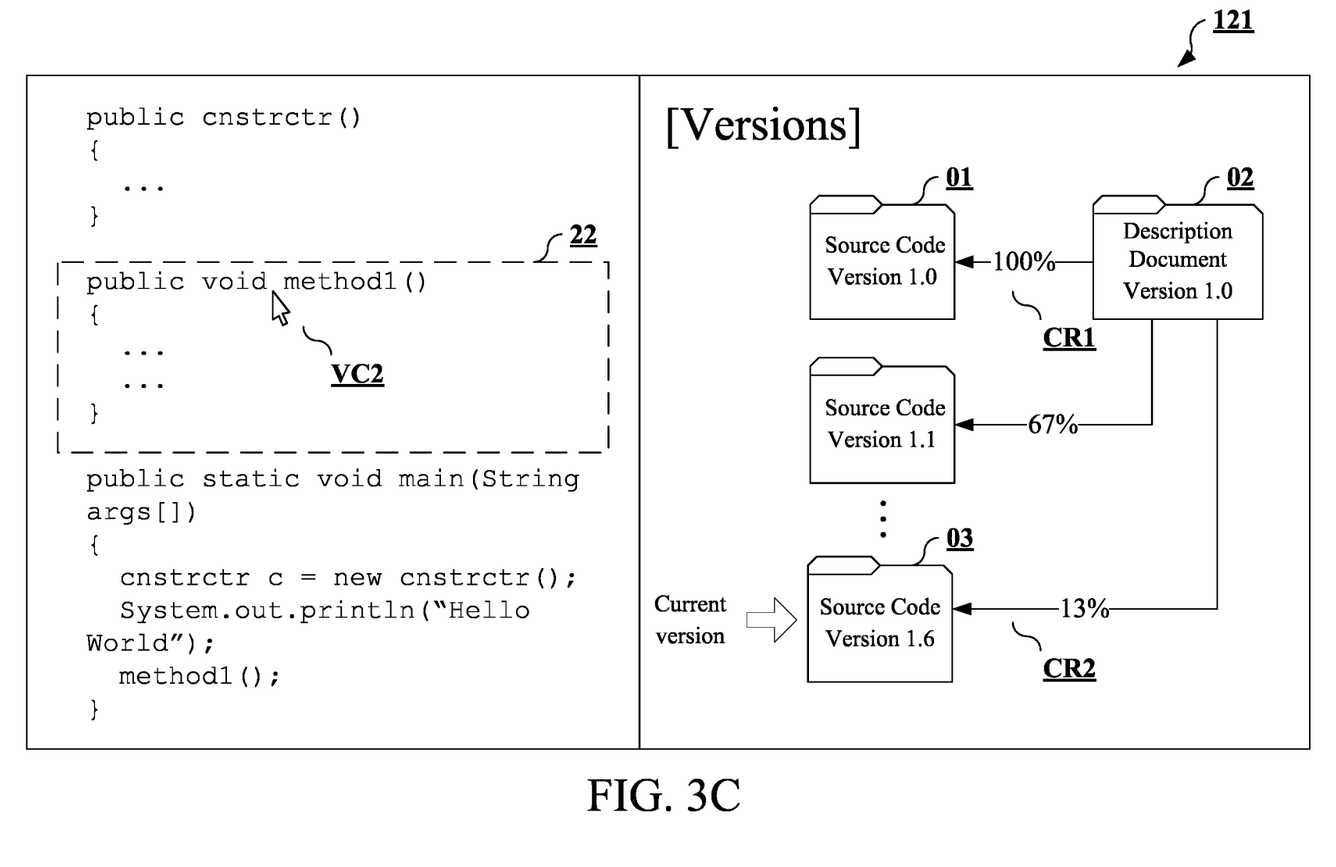

Next, when the I/O interface 12 receives a viewing command VC2 for the correspondence area 22, the I/O interface 12 may also present the object 01, the object 02, the coverage rate CR1 and the coverage rate CR2 in the graphical user interface 121 in response to the viewing command VC2. Specifically, the I/O interface 12 may receive a viewing command VC2 for the correspondence area 22 based on the user's operation, and may present, in response to the viewing command VC2, the source code of all versions that have a content association with the correspondence area 22, the description document(s) of corresponding version(s), and the coverage rate of each description document corresponding to the correspondence area 22 in the graphical user interface 121. As shown in FIG. 3C, the I/O interface 12 may present at least the objects 01, 02 and 03, the coverage rate CR2 of the object 02 corresponding to the correspondence area 22, and the coverage rate CR1 of the covered area 21 of the object 02 that has a content association with the correspondence area 22. In other words, through the graphical user interface 121, the user may clearly see that only "13%" of the source code in the correspondence area 22 of the object 03 (i.e., the source code of version 1.6) can be described/explained by the object 02 (i.e., the description document of version 1.0). Accordingly, the user may perform corresponding management operations, such as adding a new description document for the new source code in response to the coverage rate presented.

Referring back to FIG. 3A, since the coverage rate of the correspondence area 22 of the object 02 corresponding to the object 03 has reduced with the change of versions (that means the object 02 cannot effectively describe/explain the source code of the new version, i.e., the correspondence area 22 of the object 03), a description document of a new version can be created for the new version of the source code. For example, an object 04, whose type is a description document, can be created for the correspondence area 22. The storage 11 may store the object 04. The I/O interface 12 may also receive an association command AC3 similar to the association command AC2, and the processor 13 may establish an association relation AA4 for the objects 04 and 03 in response to the association command AC3, indicating that a content association exists between the objects 03 and 04.

Specifically, the processor 13 may determine, according to the association command AC3, a covered area 23 corresponding to the object 04 from the object 03, and determine a coverage rate CR3 of the object 04 corresponding to the covered area 23 (e.g., a coverage rate of "100%" means that the object 04 can describe/explain the whole content of the covered area 23). It is assumed that the covered area 23 is consistent with the correspondence area 22, that is, the correspondence area 22 that cannot be fully described/explained by the original object 02 can now be fully described/explained by the object 04.

Figure 3D:
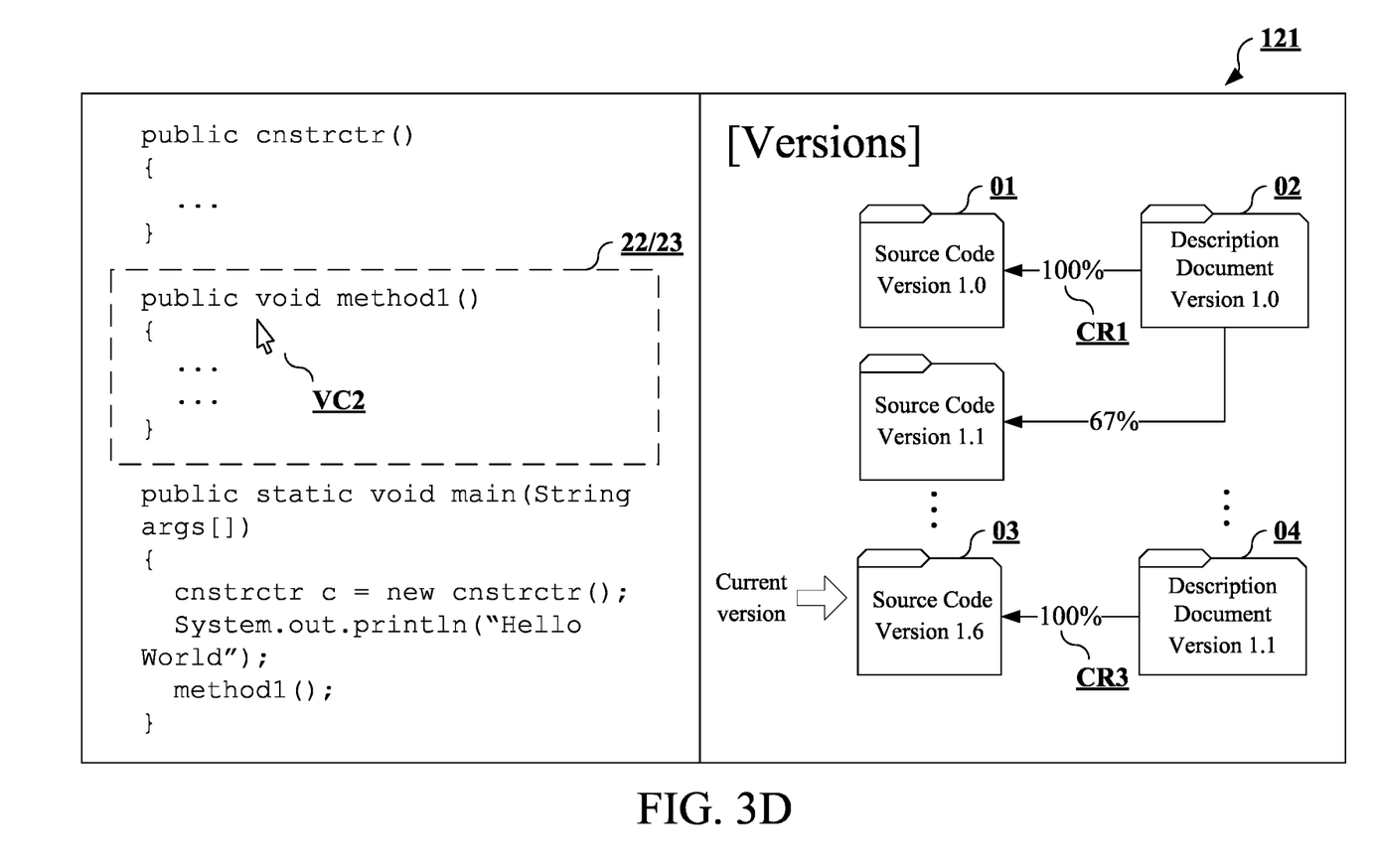

Referring to FIG. 3D, similarly, when the I/O interface 12 receives a viewing command VC2 for the correspondence area 22/covered area 23, it may also present, in response to the viewing command VC2, the source codes of all versions that have a content association with the correspondence area 22/covered area 23, the description document of corresponding versions, and the coverage rate of each description document corresponding to the correspondence area 22/covered area 23 in the graphical user interface 121, so that the I/O interface 12 may present at least the objects 01, 02, 03 and 04, the coverage rate CR1 and the coverage rate CR3. In other words, through the graphical user interface 121, the user may clearly see that the source code in the correspondence area 22 of the object 03 (i.e., the source code of version 1.6) can now be fully described/explained by the object 04 (i.e., the description document of version 1.1) with a coverage rate of "100%".

Referring back to FIG. 3A, when the user intends to describe/explain other contents than those in the correspondence area 22 of the object 03, the user may create a description document of a new version for the content. For example, the storage 11 may also store an object 05, whose type is a description document. The I/O interface 12 may also receive an association command AC4 similar to the association commands AC2 and AC3, and the processor 13 may establish an association relation AA5 between the objects 03 and 05 in response to the association command AC4, which indicates that a content association exists between the object 03 and the object 05.

Similarly, the processor 13 may determine a covered area 24 corresponding to the object 05 from the object 03 according to the association command AC4, and determine a coverage rate CR4 of the object 05 corresponding to the covered area 24 (e.g., a coverage rate of "100%" means that object 05 can describe/explain the whole content in the covered area 24).

Figure 3E:
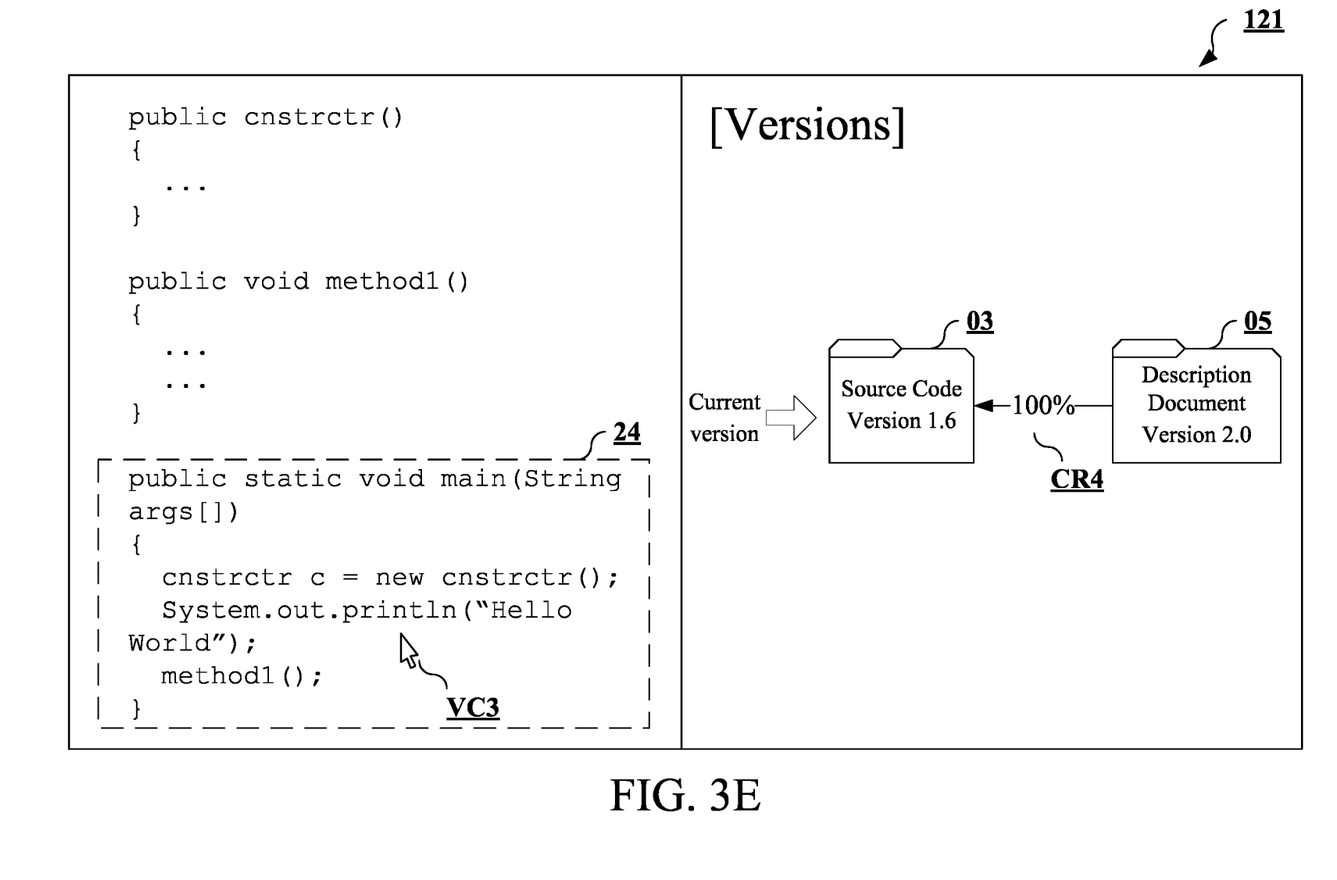

Next, please refer to FIG. 3E. Similarly, the I/O interface 12 may receive a viewing command VC3 for the correspondence area 22 based on the user's operation, and present, in response to the viewing command VC3, the source codes of all versions that have a content association with the covered area 24, the description documents of corresponding versions, and the coverage rate of each description document corresponding to the covered area 24 in the graphical user interface 121, so that the I/O interface 12 may present at least the objects 03 and 05, and the coverage rate CR4 of the object 05 corresponding to the correspondence area 24. In other words, through the graphical user interface 121, the user may clearly see that the content in the covered area 24 of the object 03 (i.e., the source code of version 1.6) can be fully described/explained by the content of the object 05 (i.e., the description document of version 2.0) with a coverage rate of "100%".

In some embodiments, for an object of the type of source code (e.g., the object 03), the processor 13 may also find out all objects that have a content association with the object, that is, finding out all description document corresponding to the object (e.g., all objects that have a content association with the object 03, including the objects 02, 04, and 05), and may perform statistical calculations (e.g., arithmetic average, geometric average, weighted average, but not limited thereto) based on the corresponding covered area (or the correspondence area) and the corresponding coverage rate of these objects, so as to calculate a covered rate for the object of the type of source code. The covered rate may represent the extent to which the object can be supported by the description document. If there is no content association between the object and other objects (i.e., the object does not correspond to any object of the type of description document), the processor 13 may determine that the covered rate of the object is "0%", indicating that there currently is no description document capable of describing/explaining the content of the object.

Similarly, in some embodiments, for an object of the type of a software-project package, the processor 13 may calculate the covered rate of the object according to the covered rate of one or more objects of the type of source code included in said object, said covered rate representing the extent to which the object of the type of software-project package can be supported by the description document.

Figure 4:
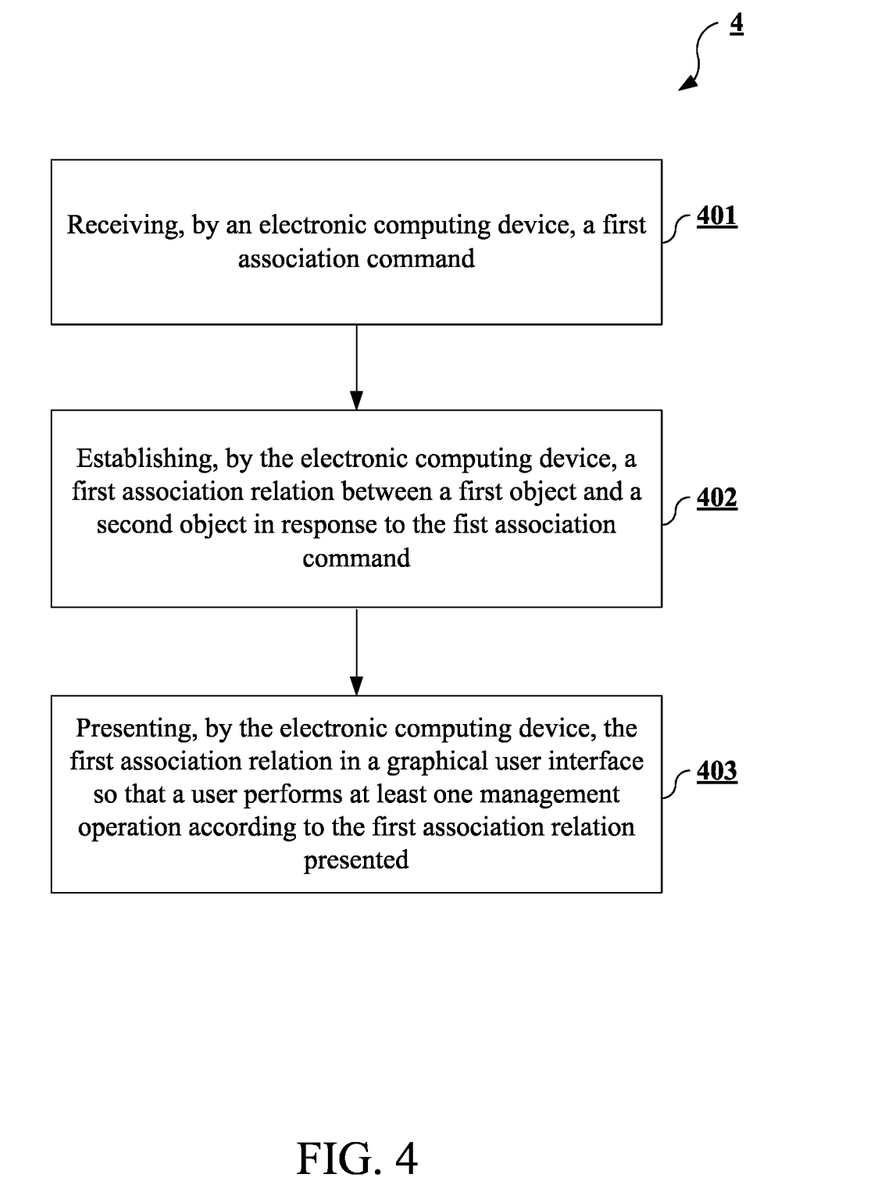
FIG. 4 depicts a flowchart of a knowledge management method in a second embodiment.

A second embodiment of the present disclosure is a knowledge management method 4 for a software project, and a flowchart thereof is depicted in FIG. 4. It should be appreciated that the content shown in FIG. 4 is only for illustrating the embodiment of the present disclosure, instead of limiting the present disclosure. The knowledge management method 4 is for use in an electronic computing device (e.g., the knowledge management device 11 of the first embodiment). The electronic computing device stores a first object and a second object, and a type of each of the first object and the second object is a software-project package, source code, or a description document. The knowledge management method 4 will be explained in detail in the following paragraph.

The knowledge management method 4 comprises steps 401, 402, and 403. In the step 401, the electronic computing device receives a first association command. In the step 402, the electronic computing device establishes a first association relation between the first object and the second object in response to the first association command. In the step 403, the electronic computing device presents the first association relation in a graphical user interface so that a user performs at least one management operation according to the first association relation presented.

In some embodiments, the first association relation established by the knowledge management method 4 between two objects is that the two objects have a same label. In some embodiments, the first association relation that the knowledge management method 4 establish between two objects is a content association between the two objects.

The details of the knowledge management method 4 related to the first association relation being that "the two objects have a same label" will be described herein first. In the embodiments, the first association command comprises a first marking command and a second marking command. In the step 401, the electronic computing device marks a label to the first object in response to the first marking command, and marks the label to the second object in response to the second marking command. As stated above, the first association relation is that the first object and the second object have the same label.

In the embodiments, after the step 402, the knowledge management method 4 may further comprise the steps of: the electronic computing device receiving a searching command associated with the label, and searching out all objects that are marked with the label in response to the searching command. In the embodiments, in the step 403, the electronic computing device presents all objects that are marked with the label in the graphical user interface so as to present the first association relation. Moreover, in the embodiments, before the step 403, the knowledge management method 4 may further comprise the steps of: the electronic computing device receiving a sorting command, and sorting all objects that are marked with the label in an order in response to the sorting command. In this case, all of the objects that are marked with the label are presented in the graphical user interface according to the order.

Next, the details of the knowledge management method 4 related to that the first association relation is a content association between the two objects are described herein. In the embodiments, the type of the first object (e.g., the object 01 described above) may be the source code, and the type of the second object (e.g., the object 02 described above) may be the description document. In the embodiments, after the step 401, the knowledge management method 4 may further comprise the steps of: the electronic computing device determining a first covered area (e.g., the covered area 21 described above) corresponding to the second object from the first object according to the first association command (e.g., the association command AC2 described above), and determining a first coverage rate (e.g., the coverage rate CR1 described above) of the second object corresponding to the first covered area. At this time, in the step 403, the electronic computing device presents the second object and the first coverage rate in the graphical user interface in response to a first viewing command for the first covered area, so as to present the first association relation (e.g., the association relation AA2 described above).

In the embodiments, the electronic computing device may further store a third object (e.g., the object 03 described above) of the type of source code, and the third object is a revision of the first object. Thus, the knowledge management method 4 may further comprise a step of: establishing, by the electronic computing device, a second association relation (e.g., the association relation AA3 described above) between the second object and the third object. Furthermore, the knowledge management method 4 may further comprise a step of: determining, by the electronic computing device, a correspondence area (e.g., the correspondence area 22 described above) of the third object corresponding to the first covered area according to the first covered area and the third object, and determining a second coverage rate (e.g., the coverage rate CR2 described above) of the second object corresponding to the correspondence area according to the corresponding area and the first covered area. Therefore, in the step 403, the electronic computing device may instead present the second object, the first coverage rate, and the second coverage rate in the graphical user interface in response to a second viewing command for the correspondence area, so as to present the first association relation.

In the embodiments, the electronic computing device may further store a fourth object (e.g., the object 05 described above) of the type of description document. Thus, the knowledge management method 4 may further comprise the steps of: the electronic computing device receiving a second association command (e.g., the association relation AC4 described above) and establishing a third association relation between the third object and the fourth object in response to the second association command, wherein the third association relation is a content association between the third object and the fourth object. The knowledge management method 4 may further comprise the steps of: the electronic computing device determining a second covered area (e.g., the covered area 24 described above) corresponding to the fourth object from the third object according to the second association relation, and determining a third coverage rate (e.g., the coverage rate CR4 described above) of the fourth object corresponding to the second covered area. Accordingly, in the step 403, the electronic computing device may instead present the fourth object and the third coverage rate in the graphical user interface in response to a third viewing command for the second covered area, so as to present the first association relation.

In addition to the aforesaid steps, the second embodiment may perform all of the operations and steps, have the same functions, and deliver the same technical effects as the knowledge management device 1 of the first embodiment does. The details of how the second embodiment performs those operations and steps, has the same functions, and delivers the same technical effects as the knowledge management device 1 based on the above descriptions of the first embodiment can be readily appreciated by a person having ordinary skill in the art, and thus will not be further described herein.

The knowledge management method 4 in the second embodiment may be implemented as a computer program product. When the computer program product is loaded into the electronic computing device, a plurality of program instructions contained in the computer program product may perform the knowledge management method 4. The computer program product may be stored in a non-transitory tangible machine-readable medium, for example but not limited to: a read-only memory (ROM), a flash memory, a floppy disk, a mobile hard disk, a magnetic tape, a database accessible to networks, or any other storage medium with the same function and well known to a person having ordinary skill in the art.

According to the above descriptions, the knowledge management techniques (including at least the device, the method, and the computer program product) for a software project provided by the present disclosure may establish an association relation between the first object and the second object associated with the software project in response to the association command, maintain the association relation during the process of software development, and present the association relation in a graphical user interface for a user so that the user can perform a more efficient management operation, for example, instantly searching out the first object and the second object through the association relation, thereby saving the time for traversing the entire software project. The user may further perform corresponding management operations to maintain the quality of the software project, such as determining that whether it is necessary to create another object with an association relation for the first object and/or the second object based on the association relation presented (e.g., the coverage rate described above). Thus, the knowledge management techniques provided by the present disclosure certainly have improved the efficiency of development and maintains the quality of the software project during the process of software development.

The above disclosure is only utilized to enumerate some embodiments of the present invention and illustrated technical features thereof, which is not used to limit the scope of the present invention. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A knowledge management device for a software project comprising:
   a storage storing a first object and a second object, wherein a type of the first object is a source code, and a type of the second object is a description document;
   at least one input/output (VO) interface, being configured to receive a first association command; and
   a processor, being electrically connected with the storage and the at least one I/O interface, and being configured to establish a first association relation between the first object and the second object in response to the first association command, wherein the first association relation is a content association between the first object and the second object;
   wherein the at least one I/O interface is further configured to present the first association relation in a graphical user interface so that a user performs at least one management operation according to the first association relation presented,
   wherein the processor is further configured to determine, according to the first association command, a first covered area corresponding to the second object from the first object and determine a first coverage rate of the second object corresponding to the first covered area,
   wherein the at least one I/O interface is further configured to present the second object and the first coverage rate in response to a first viewing command for the first covered area.

2. The knowledge management device of claim 1, wherein the storage further stores a third object and a fourth object, the at least one VO interface is further configured to receive a second association command, the second association command comprises a first marking command and a second marking command, and the processor is further configured to:
   establish a second association relation between the third object and the fourth object by performing operations comprising:
      marking a label to the third object in response to the first marking command; and marking the label to the fourth object in response to the second marking command;

wherein the second association relation is that the third object and the fourth object have the same label.

3. The knowledge management device of claim 2, wherein:
the at least one I/O interface is further configured to receive a searching command associated with the label;
the processor is further configured to search out objects that are marked with the label in response to the searching command; and
the at least one I/O interface is further configured to present the objects that are marked with the label in the graphical user interface.

4. The knowledge management device of claim 3, wherein the at least one I/O interface is further configured to receive a sorting command, and the processor is further configured to sort the objects that are marked with the label in an order in response to the sorting command, and the at least one I/O interface presents the objects that are marked with the label in the graphical user interface according to the order.

5. The knowledge management device of claim 1, wherein
the storage is further configured to store a third object, wherein a type of the third object is the source code, and the third object is a revision of the first object; and
the processor is further configured to:
establish a second association relation between the second object and the third object, wherein the second association relation is a content association between the second object and the third object;
determine, according to the first covered area and the third object, a correspondence area corresponding to the first covered area in the third object; and
calculate, according to the correspondence area and the first covered area, a second coverage rate of the second object corresponding to the correspondence area;
wherein the at least one I/O interface further presents the second object, the first coverage rate, and the second coverage rate in the graphical user interface in response to a second viewing command for the correspondence area.

6. The knowledge management device of claim 5, wherein
the storage is further configured to store a fourth object, and a type of the fourth object is the description document;
the at least one I/O interface is further configured to receive a second association command; and
the processor is further configured to:
establish a third association relation between the third object and the fourth object in response to the second association command, wherein the third association relation is a content association between the third object and the fourth object;
determine, according to the third association relation, a second covered area corresponding to the fourth object from the third object; and
determine a third coverage rate of the fourth object corresponding to the second covered area;
wherein the at least one I/O interface is further configured to present the fourth object and the third coverage rate in the graphical user interface in response to a third viewing command for the second covered area.

7. A non-transitory tangible machine-readable medium, storing a computer program product comprising a plurality of program instructions, an electronic computing device executing a knowledge management method after the computer program product is loaded into the electronic computing device, the electronic computing device storing a first object and a second object, a type of the first object being a source code, a type of the second object being a description document, the knowledge management method comprising:
receiving a first association command;
establishing a first association relation between the first object and the second object in response to the first association command, wherein the first association relation is a content association between the first object and the second object;
presenting the first association relation in a graphical user interface so that one of a first user and a second user performs at least one management operation according to the first association relation presented;
determining, according to the first association command, a first covered area corresponding to the second object from the first object;
determining a first coverage rate of the second object corresponding to the first covered area; and
presenting the second object and the first coverage rate in response to a first viewing command for the first covered area.

8. The non-transitory tangible machine-readable medium of claim 7, wherein the electronic computing device further stores a third object and a fourth object, and the knowledge management method further comprises:
receiving a second association command comprising a first marking command and a second marking command; and
establishing a second association relation between the third object and the fourth object, wherein the establishing comprises:
marking a label to the third object in response to the first marking command; and
marking the label to the fourth object in response to the second marking command;
wherein the second association relation is that the third object and the fourth object have the same label.

9. The non-transitory tangible machine-readable medium of claim 8, wherein the knowledge management method further comprises:
receiving a searching command associated with the label;
searching out objects that are marked with the label in response to the searching command; and
presenting the objects that are marked with the label in the graphical user interface.

10. The non-transitory tangible machine-readable medium of claim 9, wherein the knowledge management method further comprises:
receiving a sorting command; and
sorting the objects that are marked with the label in an order in response to the sorting command;
wherein the objects that are marked with the label are presented in the graphical user interface according to the order.

11. The non-transitory tangible machine-readable medium of claim 7, wherein the electronic computing device further stores a third object, a type of the third object is the source code, the third object is a revision of the first object, and the knowledge management method further comprises:
establishing a second association relation between the second object and the third object, wherein the second association relation is a content association between the second object and the third object;

determining, according to the first covered area and the third object, a correspondence area corresponding to the first covered area in the third object;

calculating, according to the correspondence area and the first covered area, a second coverage rate of the second object corresponding to the correspondence area; and presenting the second object, the first coverage rate, and the second coverage rate in the graphical user interface in response to a second viewing command for the correspondence area.

12. The non-transitory tangible machine-readable medium of claim 11, wherein the electronic computing device further stores a fourth object, a type of the fourth object being the description document, and the knowledge management method further comprises:

receiving a second association command;

establishing a third association relation between the third object and the fourth object in response to the second association command, wherein the third association relation is a content association between the third object and the fourth object;

determining, according to the third association relation, a second covered area corresponding to the fourth object from the third object;

determining a third coverage rate of the fourth object corresponding to the second covered area; and presenting the fourth object and the third coverage rate in the graphical user interface in response to a third viewing command for the second covered area.

13. A knowledge management method for a software project, the knowledge management method being applied to an electronic computing device that stores a first object and a second object, a type of the first object being a source code, the type of the second object being a description document, the knowledge management method comprising:

receiving a first association command;

establishing a first association relation between the first object and the second object in response to the first association command, wherein the first association relation is a content association between the first object and the second object;

presenting the first association relation in a graphical user interface so that one of a first user and a second user performs at least one management operation according to the first association relation presented;

determining, according to the first association command, a first covered area corresponding to the second object from the first object;

determining a first coverage rate of the second object corresponding to the first covered area; and presenting the second object and the first coverage rate in response to a first viewing command for the first covered area.

14. The knowledge management method of claim 13, wherein the electronic computing device further stores a third object and a fourth object, and the knowledge management method further comprises:

receiving a second association command comprising a first marking command and a second marking command; and establishing a second association relation between the third object and the fourth object, wherein the establishing comprises:

marking a label to the third object in response to the first marking command; and marking the label to the fourth object in response to the second marking command;

wherein the second association relation is that the third object and the fourth object have the same label.

15. The knowledge management method of claim 14, further comprising:

receiving a searching command associated with the label;

searching out objects that are marked with the label in response to the searching command; and presenting the objects that are marked with the label in the graphical user interface.

16. The knowledge management method of claim 13, wherein the electronic computing device further stores a third object, a type of the third object is the source code, the third object is a revision of the first object, and the knowledge management method further comprises:

establishing a second association relation between the second object and the third object, wherein the second association relation is a content association between the second object and the third object;

determining, according to the first covered area and the third object, a correspondence area corresponding to the first covered area in the third object;

calculating, according to the correspondence area and the first covered area, a second coverage rate of the second object corresponding to the correspondence area; and presenting the second object, the first coverage rate, and the second coverage rate in the graphical user interface in response to a second viewing command for the correspondence area.

17. The knowledge management method of claim 16, wherein the electronic computing device further stores a fourth object, a type of the fourth object is the description document, and the knowledge management method further comprises:

receiving a second association command;

establishing a third association relation between the third object and the fourth object in response to the second association command, wherein the third association relation is a content association between the third object and the fourth object;

determining, according to the third association relation, a second covered area corresponding to the fourth object from the third object;

determining a third coverage rate of the fourth object corresponding to the second covered area; and presenting the fourth object and the third coverage rate in the graphical user interface in response to a third viewing command for the second covered area.

* * * * *